United States Patent Office 3,573,328
Patented Mar. 30, 1971

3,573,328
5-(2-METHOXYETHYL) FURFURYL CHRYSANTHEMATE
Michio Nakanishi and Toshihiko Mukai, Oita, and Syuji Inamasu, Fukuoka, Japan, assignors to Yoshitomi Pharmaceutical Industries, Ltd., Osaka, Japan
No Drawing. Filed May 28, 1968, Ser. No. 732,522
Claims priority, application Japan, June 7, 1967, 42/36,722
Int. Cl. C07d 5/20
U.S. Cl. 260—347.4        1 Claim

ABSTRACT OF THE DISCLOSURE 5-(2-methoxyethyl)furfuryl chrysanthemate shows a stronger insecticidal activity than allethrin and as low a mammalian toxicity as naturally occurring pyrethrins, and is useful in combating a variety of insects includes common houseflies (*Musca domestica*).

This invention relates to a novel ester of chrysanthemic acid, insecticidal and miticidal compositions containing the same and the use thereof in the fields of household, horticulture and agriculture.

More particularly, the said ester of chrysanthemic acid is of the formula

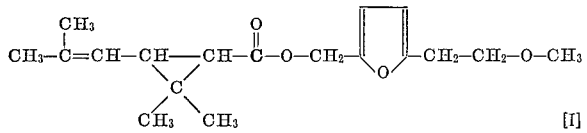

Naturally occurring pyrethrins are, in spite of their high insecticidal activity and low mammalian toxicity, expensive in cost and short in supply. Allethrin, which is most popularly used among varous synthetic pyrethroids, is much inferior to pyrethrins in effectiveness.

Although many attempts have been made to overcome the aforesaid shortcomings and other disadvantages, none, as far as the present inventors are aware, has been entirely successful.

The present inventors have succeeded in preparing a novel ester of chrysanthemic acid of above-mentioned Formula I, finding that it shows a stronger insecticidal activity than allethrin and as low a mammalian toxicity as naturally occurring pyrethrins.

The ester can be prepared by means of conventional esterification from chrysanthemic acid or its functional derivative such as acid chloride or a metal salt, on one hand, and 5-(2-methoxyethyl)furfuryl alcohol or the corresponding halide on the other hand.

Thus, the ester is prepared, for example, by reacting chrysanthemoyl chloride with 5-(2-methoxyethyl)furfuryl alcohol [II]. After the reactants are mixed in a solvent such as a petroleum hydrocarbon, benzene or dimethyl sulfoxide, in the presence of an acid acceptor such as pyridine, diethylaniline, triethylamine or potassium carbonate, at —20° to 30° C., the mixture is kept at room temperature for 0.5 to 24 hours, and if necessary, the mixture is then heated at 60° C. to 80° C. to complete the reaction.

The same ester is prepared by the reaction of chrysanthemic anhydride with the alcohol [II] in a solvent such as a petroleum hydrocarbon solvent, benzene, dimethylformamide or dimethyl sulfoxide, in the presence of a base such as pyridine (also serving as solvent). The reactants are treated by the procedure described above.

Free chrysanthemic acid may be heated with the alcohol [II] in a solvent such as benzene or pyridine, in the presence of a catalyst such as boron trifluoride, p-toluenesulfonic acid or p-toluenesulfonyl chloride, at 25° to 100° C. for 2 to 10 hours, to obtain the desired ester.

The ester exchange between methyl or ethyl chrysanthemate and the alcohol [II] will also afford the desired ester. The reactants are heated without solvent or in a solvent such as benzene, in the presence of a catalyst such as potassium carbonate, sodium ethoxide or aluminum isopropoxide, under reduced pressure (e.g. 50 to 200 mm. Hg) or in a nitrogen atmosphere, at 60° to 160° C. for 1 to 20 hours.

The ester is also prepared by heating sodium chrysanthemate and 5-(2-methoxyethyl)furfuryl chloride [III] in a solvent such as benzene, dimethylformamide, dimethyl sulfoxide or hexamethyl phosphoric triamide, in the presence of triethylamine etc., at 60° to 100° C. for 1 to 20 hours.

The starting materials [II] and [III] may be prepared as follows:

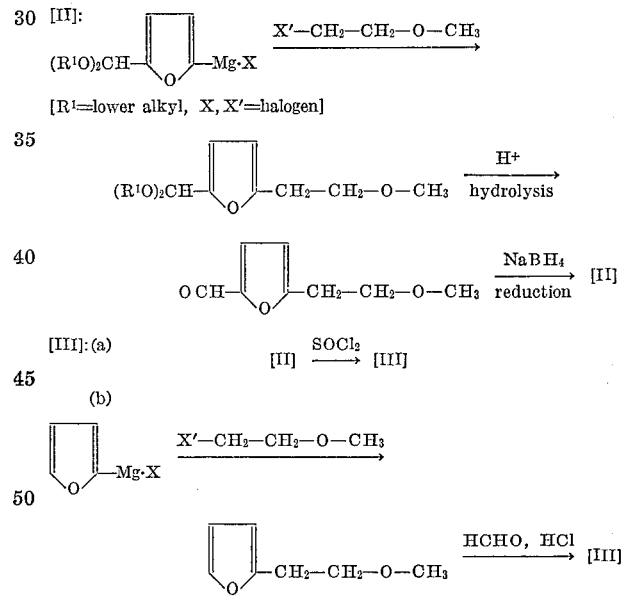

EXAMPLE 1

5-(2-methoxyethyl)furfuryl alcohol (1.2 grams) is dissolved in 20 milliliters of benzene, 0.67 gram of dried pyridine is added, and then a benzene solution containing 1.43 grams of chrysanthemoyl chloride is added dropwise at 10° to 15° C. The mixture is kept at room temperature for 4 hours. Then 40 milliliters of water is added to dissolve pyridine hydrochloride. The benzene layer is washed with water and a cold dilute potassium carbonate solution, and the benzene is distilled off. The residue (2.0 grams) is purified by chromatography (chloroform eluant; silicic acid column) to give 1.5 grams of 5-(2-methoxyethyl)furfuryl chrysanthemate. $n_D^{26.5}=1.4919$. The ester occurs as a slightly yellowish transparent liquid.

EXAMPLE 2

5-(2-methoxyethyl)furfuryl alcohol (1.5 grams) is dissolved in 30 milliliters of dried pyridine, 3.2 grams of chrysanthemic anhydride is added at 0° to 5° C., and the mixture is allowed to stand overnight at room temperature. The reaction mixture is poured into a large amount of ice water, and extracted with benzene. After washing the benzene layer with water, the benzene is distilled off to give 3 grams of crude 5-(2-methoxyethyl)furfuryl chrysanthemate ($n_D^{26.5}=1.5038$), which is purified by chromatography (chloroform eluant; silicic acid column). $n_D^{26.5}=1.4920$.

EXAMPLE 3

5-(2-methoxyethyl)furfuryl alcohol (1.5 grams) is added to a solution of 1.7 grams of chrysanthemic acid in 30 milliliters of pyridine. To the mixture, 1.9 grams of p-toluenesulfonyl chloride is added dropwise at 10° to 20° C. Then the mixture is heated at 40° C. for 2 hours and at the 60° C. for the next 2 hours, then poured into a large amount of ice water, and extracted with benzene. After washing the extract with water and removing the benzene by distillation, 2.5 grams of crude 5-(2-methoxyethyl)furfuryl chrysanthemate is obtained. It is purified by chromatography. $n_D^{26.5}=1.4915$.

EXAMPLE 4

A mixture of 3.6 grams of methyl chrysanthemate, 3.5 grams of 5-(2-methoxyethyl)furfuryl alcohol and 0.5 gram of potassium carbonate is heated at 100° to 120° C. under reduced pressure of 100 to 150 mm. Hg for 4 hours. Then the mixture is extracted with benzene, the extract is washed with water and the benzene is distilled off. There is obtained 4.8 grams of crude 5-(2-methoxyethyl)furfuryl chrysanthemate, which is purified by chromatography. $n_D^{26.5}=1.4919$.

EXAMPLE 5

A mixture of 3.8 grams of sodium chrysanthemate, 3.5 grams of 5-(2-methoxyethyl)furfuryl chloride, 0.5 gram of triethylamine and 20 milliliters of benzene is heated under reflux for 4 hours. A precipitate of sodium chloride is removed by treatment with 40 milliliters of water. The benzene layer is further washed with water, and the benzene is distilled off to give 3.5 grams of crude 5-(2-methoxyethyl)furfuryl chrysanthemate. It is chromatographed (chloroform eluant; silicic acid column). $n_D^{26.5}=1.4923$.

5-(2-methoxyethyl)furfuryl chrysanthemate can control various household, horticultural and agricultural pests such as flies, mosquitoes, cockroaches, fleas, lice, aphids, beetles, scales, tortrices, worms, mites, weevils, moths, hoppers, leafhoppers, caterpillars, bugs, chafers, rollers and locusts.

A pesticidal composition of the present invention can be prepared, for example, by dissolving or dispersing the ester in a suitable carrier (e.g. solvent) or alternatively, admixing the same compound with a suitable solid carrier (e.g. diluent, dust diluent, etc.) or allowing the same compound to be adsorbed thereon.

If desired, the compositions can be further admixed with emulsifiers, dispersing agents, suspension aids, penetrating agents, wetting agents, thickeners, stabilizers, etc., to prepare solutions, emulsions, wettable powders, dusts, granules, aerosols, mosquito coils, baits, sprays and the like.

It should be understood: it is advantageous that the composition contains an extender of the activity, such as N-(2-ethylhexyl)-1-isopropyl-4-methyl-bicyclo[2,2,2]oct-5-ene-2,3-dicarboximide,
N-(2-ethylhexyl)-bicyclo[2,2,1]hept-5-ene-2,3-dicarboximide,
α-[2-(2-butoxyethoxy)ethoxy]-4,5-methylenedioxy-2-propyltoluene,
1,2-methylenedioxy-4-[2-(octylsulfinyl)-propyl]benzene,
dipropyl 3-methyl-6,7-methylenedioxy-1,2,3,4-tetrahydronaphthalene-1,2-dicarboxylate,
4-(3,4-methylenedioxyphenyl)-5-methyl-1,3-dioxane,
bis(2,3,3,3-tetrachloropropyl) ether,
isobornyl thiocyanatoacetate,
2-(3,4-methylenedioxyphenoxy)-3,6,9-trioxaundecane, and
piperonal bis[2-(2-butoxyethoxy)ethyl]acetal.

Generally speaking, the suitable concentration of the effective component ranges from 0.001 to 50% by weight, more preferably about 0.001 to 2% by weight in the case of a spray, an aerosol, a suspension, an emulsion or an oil-base formulation; from about 0.01 to about 5% by weight in the case of a dust agent; or from 10 to 50% by weight in the case of an emulsifiable concentrate or a wettable powder.

But the said ranges can be modified as desired according to particular applications.

Solvents which can be successively employed for the compositions of the present invention include, for example, water, alcohols (e.g. methyl alcohol, ethyl alcohol, ethylene glycol, etc.), ketones (e.g. acetone, methylethyl ketone, etc.), ethers (e.g. dioxane, tetrahydrofuran, Cellosolve, etc.) aliphatic hydrocarbons (e.g. gasoline, kerosene, machine oil, fuel oil, etc.), aromatic hydrocarbons (e.g. benzene, toluene, xylene, solvent naphtha, methylnaphthalene, etc.), organic bases (e.g. pyridine, collidine, etc.), acid amides (e.g. dimethylformamide etc.), esters (e.g. ethyl acetate, etc.), nitriles (e.g. acetonitrile, etc.) and the like. Such solvents can be employed either singly or in combinations.

As the said diluent, adulterant, etc., vegetable powders (e.g. soybean powder, tobacco powder, walnut powder, wood flour, flour, charcoal powder, pyrethrum marc, etc.), mineral powders (e.g. clays such as kaolin, bentonite, acid clay, etc., talcs such as talc, soapstone, etc., and silicas such as diatomaceous earth, mica powder, etc.), as well as alumina, silica gel, sulfur powder, active carbon, etc., can be successfully employed either singly or in various combinations.

The surface active agents to be employed as emulsifier, penetrating agent, dispersing agent, solubilizing agent, etc. mentioned hereinbefore are exemplified by soaps, the sulfuric acid esters of higher alcohols, olefin sulfates, sulfated oils, ethanolamine, higher fatty acid esters, alkylarylsulfonates, quaternary ammonium salts, alkyleneoxide type activating agent, anhydrosorbitol type activating agents, and the like.

In addition to those agents mentioned above, it is also possible, for the purpose stated in the foregoing, to employ, if required, such substances as casein, gelatin, agar, starch, bentonite, aluminum hydroxide, etc.

To these preparations, there can be further added insecticides such as pyrethrins, allethrin, organophosphorus insecticides, chlorinated hydrocarbon insecticides and carbamate insecticides as well as fungicides, miticides, fertilizers, etc., those being to be construed as a part of the carrier or adjuvant in the composition of the present invention.

Formulation 1 (emulsifiable concentrate)

| | Parts by weight |
|---|---|
| Ester [I] | 10 |
| Polyoxyethylene nonylphenyl ether | 10 |
| Xylene | 40 |
| Kerosene | 40 |

The emulsifiable concentrate is practically applied in a form of its 20 to 200 times aqueous dilution for getting rid of mites, cockroaches, beetles, houseflies or mosquitoes.

Formulation 2 (oil-base formulation)

| | Parts by weight |
|---|---|
| Ester [I] | 0.2 |
| 2,6-di-tert-butyl-p-cresol | 0.2 |
| α-[2-(2-butoxyethoxy)ethoxy]-4,5-methylenedioxy-2-propyltoluene | 2 |
| Methylnaphthalene | 47.6 |
| Kerosene | 50 |

The oil-base formulation is applied to the fields as it is in a ratio of 10 to 20 liters per acre for getting rid of moths, hoppers or caterpillars.

Formulation 3 (dust)

Ester [I] (0.3 part by weight) is dissolved in 10 parts by weight of methanol, the solution is mixed with 30 parts by weight of pyrethrum marc and 69.7 parts by weight of talc (200 to 300 mesh), and the whole is dried.

The dust agent is homogeneously applied to plants etc. as it is in a ratio of 0.3 to 0.6 kg./are for destroying lice, fleas, bugs, worms or moths.

Formulation 4 (mosquito coil)

Ester [I] (0.7 part by weight) is dissolved in 5 parts by weight of methanol, the solution is mixed with 46.3 parts by weight of wood flour and 50 parts by weight of pyrethrum marc, 100 parts by weight of water and 3 parts by weight of starch are added, and the whole is kneaded, formed into coils and dried.

The mosquito coil is applied for destroying houseflies, mosquitoes and so on.

Formulation 5 (aerosol)

| | Parts by weight |
|---|---|
| Ester [I] | 0.5 |
| Bis(2,3,3,3-tetrachloropropyl) ether | 3 |
| Xylene | 6.5 |
| Kerosene | 10 |
| Propellant | 80 |

The areosol is applied for exterminating houseflies, mosquitoes, cockroaches and so on.

Formulation 6 (wettable powder)

| | Parts by weight |
|---|---|
| Ester [I] | 10 |
| Polyoxyethylene nonylphenyl ether | 10 |
| Acid clay | 80 |

The wettable powder is practically applied in a form of 10 to 100 times aqueous suspension for getting rid of aphids or cockroaches.

Test 1.—One milliliter of an acetone solution containing the insecticide at a given concentration was spread on the bottom of a petri dish (9 cm. diameter) and air-dried. Ten houseflies *Musca domestica vicina* Takatuski strain (3 to 4 days after emergence) were brought into contact with the insecticide on the bottom. Median knock down time ($KT_{50}$) and 90% knock down time ($KT_{90}$) in minutes (min.) and mortality in 24 hours were as follows:

| Insecticide | Concentration, percent by weight | $KT_{50}$ (min.)* | $KT_{90}$ (min.)* | Mortality (percent)* |
|---|---|---|---|---|
| Ester [I] | 0.5 | 1.0 | 2.1 | 100 |
| Do | 0.1 | 1.4 | 3.5 | 100 |
| Do | 0.05 | 3.0 | 4.5 | 100 |
| Do | 0.01 | 5.6 | 8.2 | 100 |
| Allethrin | 0.01 | 6.5 | 10.8 | 100 |
| Control | 0 | | | 0 |

*The mean value of 4 tests.

Test 2.—Median lethal dose ($LD_{50}$) against the housefly (Takatsuki strain, male and female) was determined by topical application method using acetone solutions as follows:

| | Gamma/fly |
|---|---|
| Ester [I] | 0.561 |
| Allethrin | 0.800 |

Test 3.—$KT_{50}$ and mortality in 24 hours of acetone solutions containing abovementioned extenders of the activity as well as ester [I] were determined by the procedure in Test 1. The results are shown as follows:

| Extender* | Concentration, percent by weight | Concentration of [I], percent by weight | $KT_{50}$ (min.) | Mortality (percent) |
|---|---|---|---|---|
| A | 0 | 0.01 | 4.5 | 100 |
|   | 0 | 0.025 | 8.3 | 72 |
|   | 0.05 | 0.01 | 4.2 | 100 |
|   | 0.0125 | 0.0025 | 6.6 | 73 |
| B | 0.05 | 0.01 | 4.0 | 100 |
|   | 0.0125 | 0.0025 | 7.6 | 100 |
| C | 0.05 | 0.01 | 2.7 | 100 |
|   | 0.0125 | 0.0025 | 7.2 | 100 |
| D | 0.05 | 0.01 | 4.2 | 100 |
|   | 0.0125 | 0.0025 | 8.6 | 100 |
| E | 0.05 | 0.01 | 3.1 | 100 |
|   | 0.0125 | 0.0025 | 7.5 | 100 |
| F | 0.05 | 0.01 | 3.1 | 100 |
|   | 0.0125 | 0.0025 | 7.5 | 100 |
| G | 0.05 | 0.01 | 4.1 | 100 |
|   | 0.0125 | 0.0025 | 7.4 | 92 |

*A = N-(2-ethylhexyl)bicyclo[2,2,1]hept-5-ene-2,3-dicarboximide; β = -N(2-ethylhexyl)-1-isopropyl-4-methyl-bicyclo[2,2,2]oct-5-ene-2,3-dicarboximide; C = bis(2,3,3,3-tetrachloropropyl) ether; D = 4-(3,4-methylenedioxyphenyl)-5-methyl-1,3-dioxane; E = 1,2-methylenedioxy-4-[2-(octylsulfinyl)propyl]benzene; F = α-[2-(2-butoxyethoxy)ethoxy]-4,5-methylenedioxy-2-propyltoluene; G = dipropyl 3-methyl-6,7-methylenedioxy-1,2-3,4-tetrahydronaphthalene-1,2-dicarboxylate.

Test 4.—Compositions of samples (parts by weight):

| | I | II | III |
|---|---|---|---|
| Ester [I] | 0.1 | 0.1 | 0.1 |
| C* | | 0.8 | |
| F* | | | 0.8 |
| Deodorized kerosene | 100 | 99 | 99 |

*C and F are the same as those in Test 3, respectively.

Through the hole of the top of a glass cylinder (43.5 cm. high, 22 cm. in outer diameter), 0.3 milliliter of the sample was sprayed into the cylinder under 3 kg./cm.² pressure. After 10 seconds, by sliding open a glass plate at the bottom of the cylinder the mist was allowed to enter a glass pot (15 cm. high, 15 cm. in outer diameter) containing 20 adult houseflies (4 days after emergence) through a wire netting. The number of individuals knocked down was counted at intervals. Knock down percentage, $KT_{50}$ and mortality in 24 hours were determined. The results were as follows:

| | Knock down percentage*, time (min.) | | | | | | | $KT_{50}$* (min.) | Mortality (percent) |
|---|---|---|---|---|---|---|---|---|---|
| | 2 | 3 | 4 | 6 | 8 | 10 | 15 | | |
| Sample I | 16 | 37 | 51 | 74 | 88 | 88 | 100 | 3.9 | 100 |
| Sample II | 34 | 65 | 83 | 100 | | | | 2.4 | 100 |
| Sample III | 22 | 41 | 55 | 86 | 95 | 100 | | 3.5 | 100 |

*The mean value of three tests.

Test 5.—The mosquito coil was prepared so as to contain 0.2% of the ester [I], or 0.2% of the ester [I] and 1% of an extender.

Through the central hole of the bottom of a glass cylinder (20 cm. in inner diameter, 43 cm. high) containing 20 adult houseflies (Takatsuki strain), 0.5 gram of the mosquito coil giving off smoke was put into the cylinder. $KT_{50}$ and mortality in 24 hours were determined as follows:

| Extender* | $KT_{50}$ (min.) | Mortality (percent) |
|---|---|---|
|  | 15 | 85 |
| A | 14 | 95 |
| B | 12.5 | 100 |
| D | 13 | 100 |
| E | 12 | 100 |
| F | 13 | 100 |
| G | 14 | 100 |

*Extenders A to G are the same as those in Test 3, respectively.

What is claimed is:
1. 5-(2-methoxyethyl)furfuryl chrysanthemate.

References Cited

UNITED STATES PATENTS 3,465,007  9/1969  Elliot _____ 260—347.4

ALEX MAZEL, Primary Examiner

B. I. DENTZ, Assistant Examiner

U.S. Cl. X.R.

424—285